(12) United States Patent  (10) Patent No.: US 8,371,914 B2
Cressoni  (45) Date of Patent: Feb. 12, 2013

(54) CORN-SHELLING MACHINE FITTED WITH BLOWER MEANS AND RELATIVE CORN-SHELLING METHOD

(75) Inventor: Romano Cressoni, Mantova (IT)

(73) Assignee: F.lli Cressoni S.p.A., Volta Mantovana, Mantova (IT)

( * ) Notice: Subject to any disclaimer, the term of this patent is extended or adjusted under 35 U.S.C. 154(b) by 0 days.

(21) Appl. No.: 13/191,905

(22) Filed: Jul. 27, 2011

(65) Prior Publication Data

US 2012/0190414 A1   Jul. 26, 2012

(30) Foreign Application Priority Data

Aug. 3, 2010   (IT) ............................... PD2010A0250

(51) Int. Cl.
*A01F 11/06* (2006.01)
*B02B 3/04* (2006.01)
(52) U.S. Cl. ........................................................ 460/29
(58) Field of Classification Search ............... 460/29, 460/27, 31, 32, 33, 35; 56/104, 107, 14.3, 56/52, 119, 51, 62
See application file for complete search history.

(56) References Cited

U.S. PATENT DOCUMENTS

| | | | |
|---|---|---|---|
| 2,672,003 A | | 3/1954 | Ashton |
| 2,797,543 A | | 7/1957 | Rasmussen |
| 2,821,058 A * | 1/1958 | Jones ............................... 56/108 |
| 2,947,133 A * | 8/1960 | Hyman et al. ................... 56/110 |
| 3,067,561 A * | 12/1962 | Jezek ................................ 56/34 |
| 3,101,579 A * | 8/1963 | Karlsson et al. ................. 56/105 |
| 3,126,688 A | | 3/1964 | Karlsson |
| RE25,667 E * | 10/1964 | Jezek ................................. 56/34 |
| 3,262,255 A * | 7/1966 | Karlsson et al. ................. 56/107 |
| 3,462,928 A * | 8/1969 | Schreiner et al. ............... 56/104 |
| 3,606,743 A | | 9/1971 | Johnson |
| 4,233,804 A * | 11/1980 | Fischer et al. ................... 56/104 |
| 5,009,061 A * | 4/1991 | Heuling .......................... 56/104 |
| 5,161,356 A * | 11/1992 | Pick ................................. 56/60 |
| 5,282,352 A * | 2/1994 | Schoolman ....................... 56/62 |
| 5,404,699 A * | 4/1995 | Christensen et al. ........... 56/104 |
| 5,680,750 A * | 10/1997 | Stefl ................................. 56/62 |
| 6,050,071 A * | 4/2000 | Bich et al. ........................ 56/52 |
| 6,216,428 B1 * | 4/2001 | Becker et al. ................... 56/104 |
| 7,062,896 B2 * | 6/2006 | Resing et al. .................... 56/64 |
| 7,237,373 B2 * | 7/2007 | Resing et al. ................... 56/104 |
| 7,373,767 B2 * | 5/2008 | Calmer ............................ 56/95 |
| 7,395,649 B2 * | 7/2008 | Wubbels et al. ................. 56/52 |
| 7,493,745 B2 * | 2/2009 | Wubbles et al. ............... 56/14.3 |
| 7,886,510 B2 * | 2/2011 | Calmer .......................... 56/104 |
| 8,171,708 B2 * | 5/2012 | Calmer ............................. 56/62 |

(Continued)

FOREIGN PATENT DOCUMENTS

EP   1757181   2/2007

*Primary Examiner* — Árpád Fábián-Kovács
(74) *Attorney, Agent, or Firm* — Shoemaker and Mattare

(57) ABSTRACT

A corn-shelling machine has a front head and a rear auger to collect and channel the cobs after shelling. The front head has at least one sheller roller fitted with blades to pull a stalk of a corn on the plant downwards. Sheller plates are positioned above the sheller roller, on the side opposite the ground. The sheller plates have an upper wall, opposite the ground and suitable to receive the cobs upon threshing and to retain them during the shelling phase. A blower generates a flow of air to channel the kernels of corn, removed from the cobs during shelling, towards the rear auger. The air flow is directed from the front head of the machine towards the rear auger.

13 Claims, 9 Drawing Sheets

U.S. PATENT DOCUMENTS

| | | | |
|---|---|---|---|
| 2002/0004418 A1* | 1/2002 | Mesquita et al. | 460/115 |
| 2003/0079459 A1* | 5/2003 | Bongert et al. | 56/104 |
| 2003/0172639 A1* | 9/2003 | Calmer | 56/51 |
| 2004/0016219 A1* | 1/2004 | Calmer | 56/51 |
| 2007/0266689 A1* | 11/2007 | Calmer | 56/62 |
| 2009/0113869 A1* | 5/2009 | Cressoni | 56/104 |
| 2009/0249759 A1* | 10/2009 | Calmer | 56/62 |

\* cited by examiner

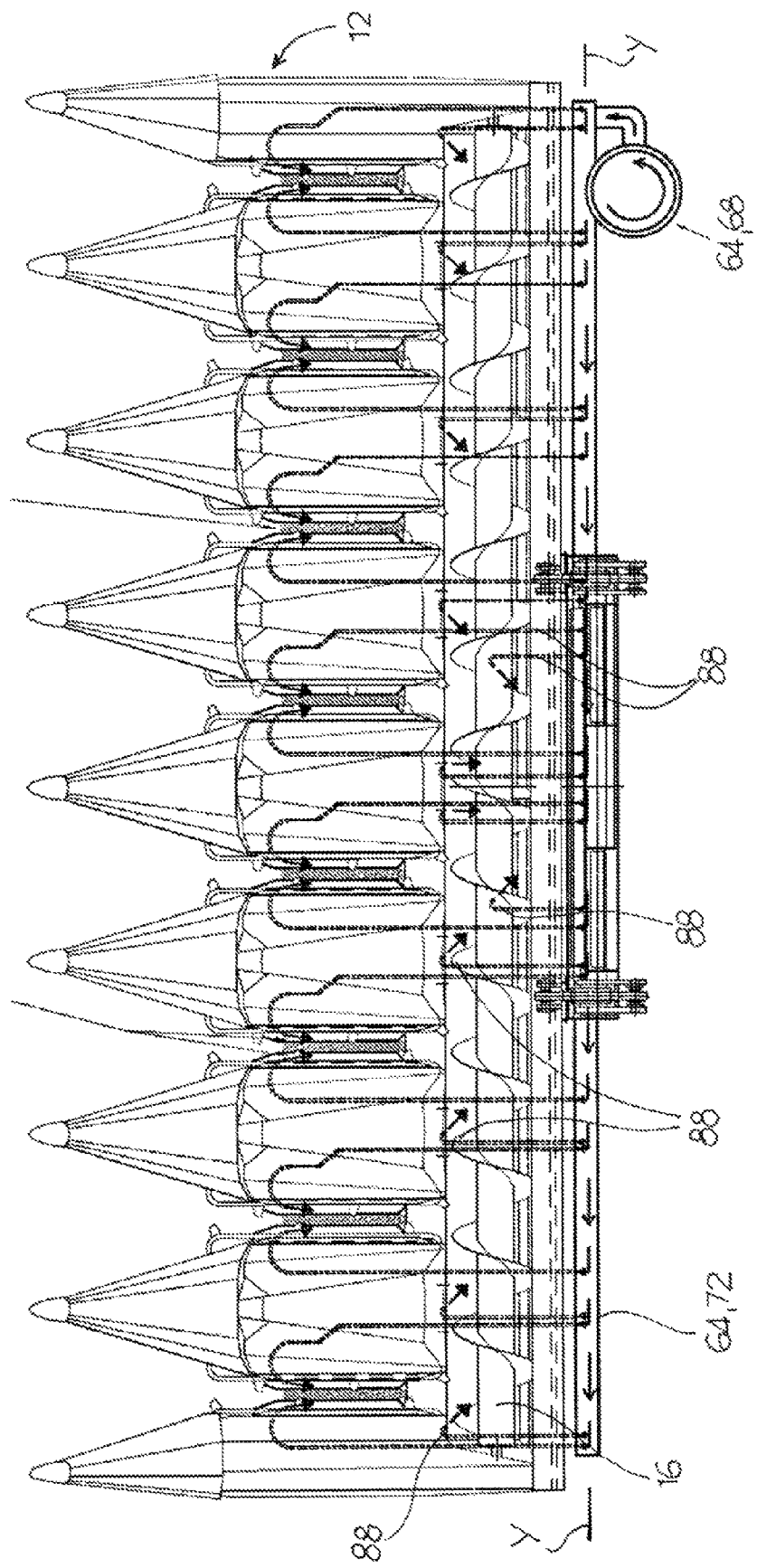

CORN-SHELLING MACHINE FITTED WITH BLOWER MEANS AND RELATIVE CORN-SHELLING METHOD

FIELD OF THE INVENTION

The present invention relates to a corn-shelling machine suitable to detach or shell the cobs from the relative stem or stalk of the corn on the cob plants.

BACKGROUND OF THE INVENTION

In particular, the corn-shelling machines of the prior art have a head fitted with a rotating roller, and preferably pairs of rollers counter-rotating in relation to rotation axes substantially horizontal to the ground or incident with the ground on the side of the direction of advancement of the machine.

The counter-rotating rollers are fitted with blades which pull the stalks of the plants downwards, picking the cobs.

The blades therefore rotate in a direction which pushes the stalk of the corn on the cob plant downwards, towards the ground; contemporarily the cobs, positioned on the upper part of the stalk, are forced to pass through a meatus delimited by pairs of sheller plates. The sheller plates interfere with the cobs, preventing them from falling through the meatus onto the ground. The cobs are then channelled towards an auger of the corn-shelling machine.

During the shelling phase of the cobs, the latter by coming into contact with the sheller plates inevitably lose corn grain or kernels which pass through the meatus identified by the sheller plates and fall to the ground. The loss of corn grain may be significant and notably reduce the harvest.

Once dropped onto the ground the kernels are no longer recovered, in part because this would be a time-consuming and expensive operation, and rot on the ground together with the stalk of the plant.

SUMMARY OF THE INVENTION

The purpose of the present invention is to make a corn-shelling machine which overcomes the drawbacks mentioned with reference to the prior art.

In particular, the purpose of the present invention is to make a corn-shelling machine which can limit the loss of corn grain occurring during shelling of the cobs to a minimum.

Such purpose is achieved by a corn-shelling machine as described below.

Other embodiments of the corn-shelling machine according to the invention are described subsequently.

BRIEF DESCRIPTION OF THE DRAWINGS

Further characteristics and advantages of the present invention will be more clearly comprehensible from the description below of its preferred embodiments, made by way of non-limiting examples wherein:

FIG. 6 shows a plan view of a multiple head of a corn-shelling machine according to a further embodiment of the present invention;

FIG. 7 shows a side view of a machine according to a further embodiment of the present invention;

DETAILED DESCRIPTION OF THE INVENTION

Figure 1:
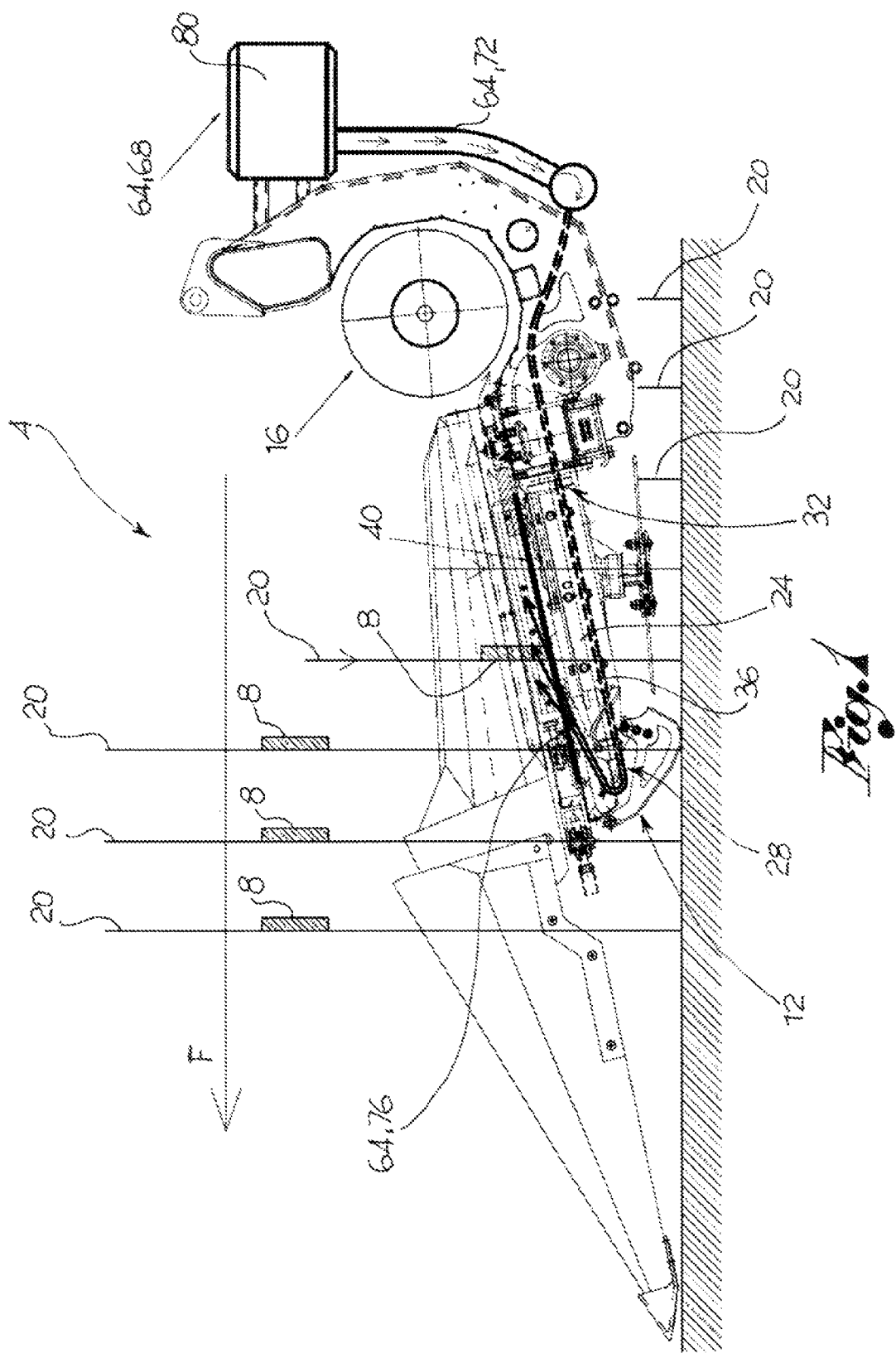
FIG. 1 shows a side view of a corn-shelling machine according to one embodiment of the present invention.
Figure 2:
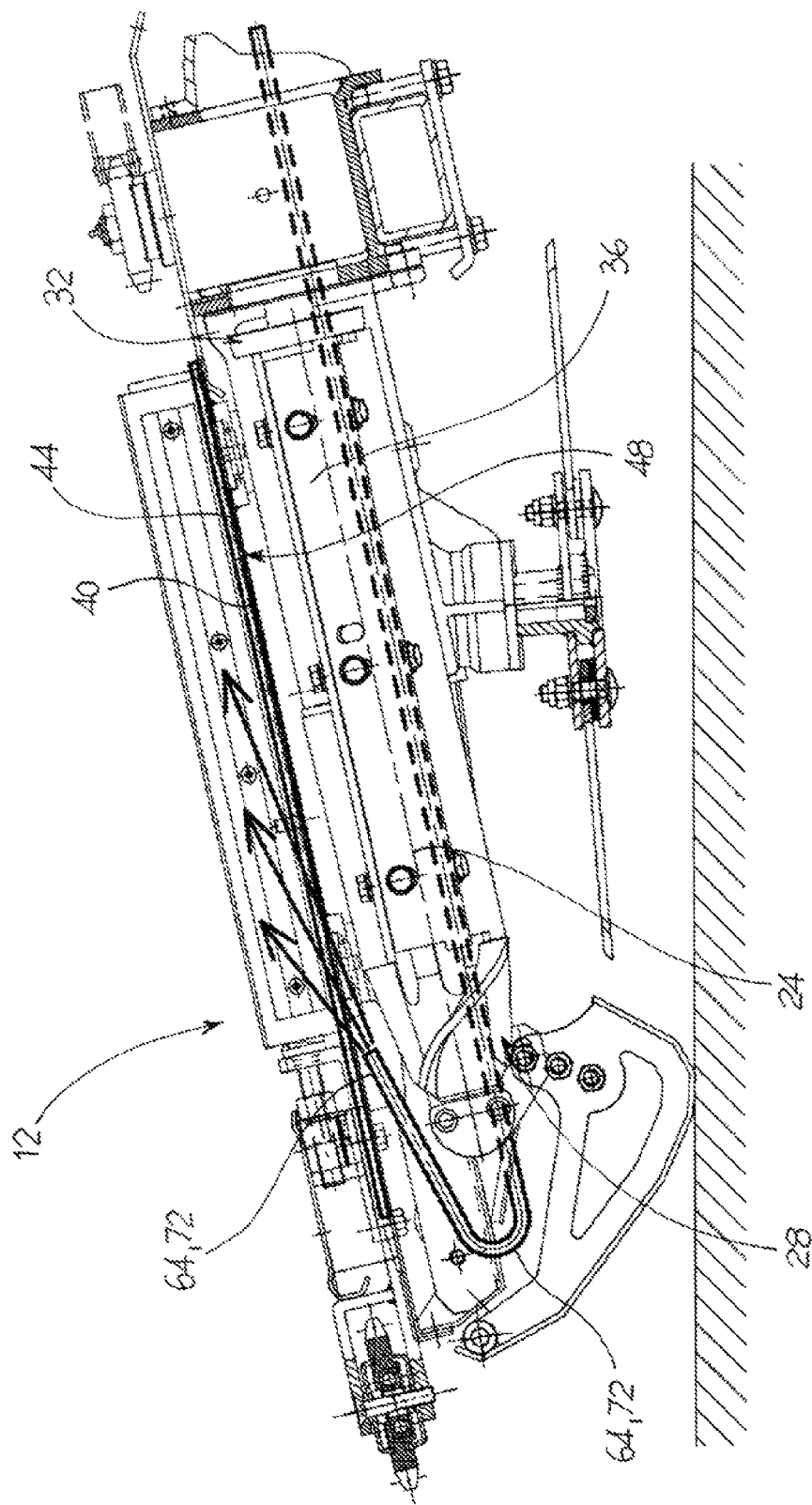
FIG. 2 shows an enlarged view of a detail of the machine in FIG. 1.
Figure 3:
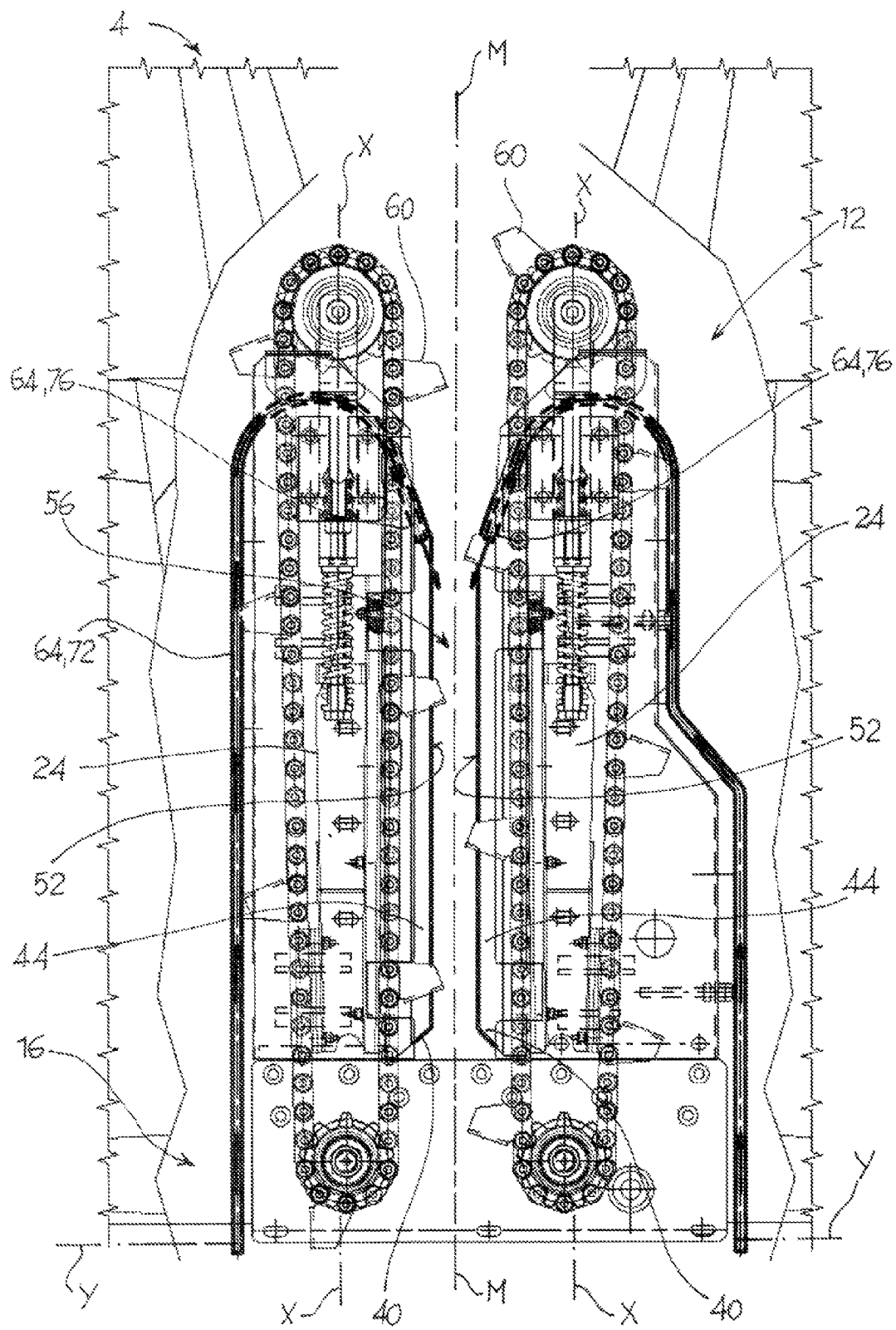
FIG. 3 shows a plan view from above of the detail in FIG. 2.
Figure 4:
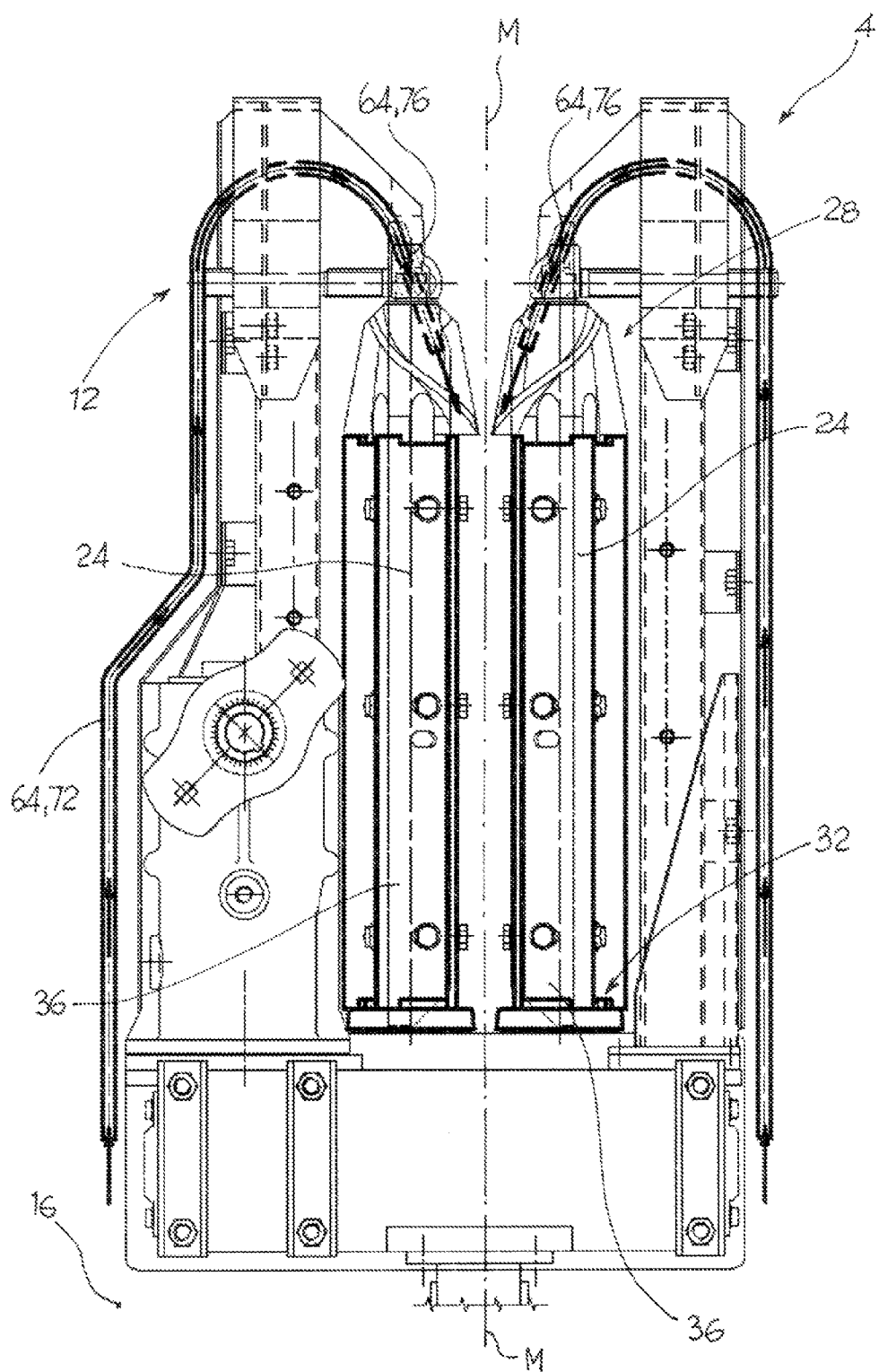
FIG. 4 shows a plan view from below of the detail in FIG. 2.
Figure 5:
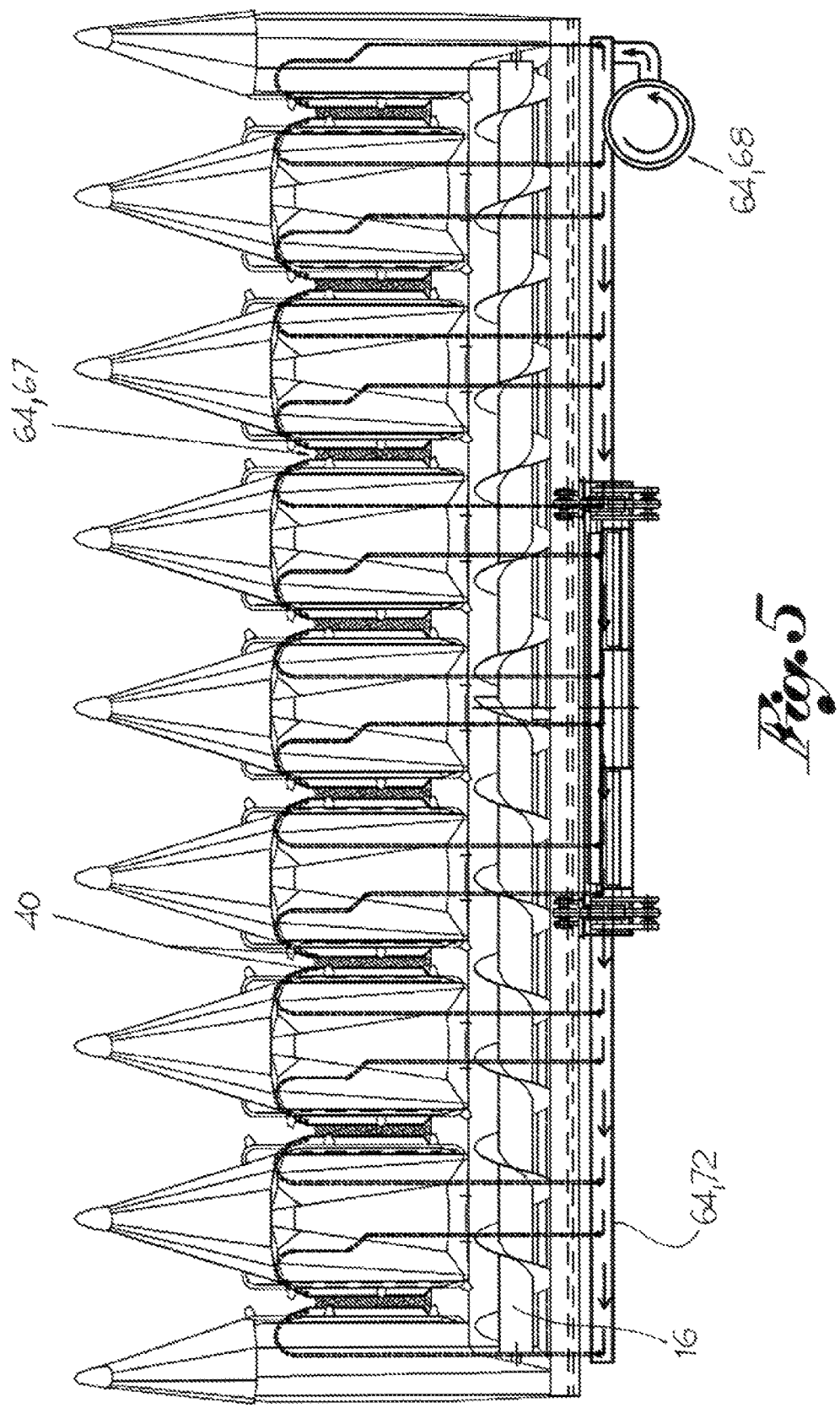
FIG. 5 shows a plan view of a multiple head of a corn-shelling machine according to the present invention.
Figure 1:
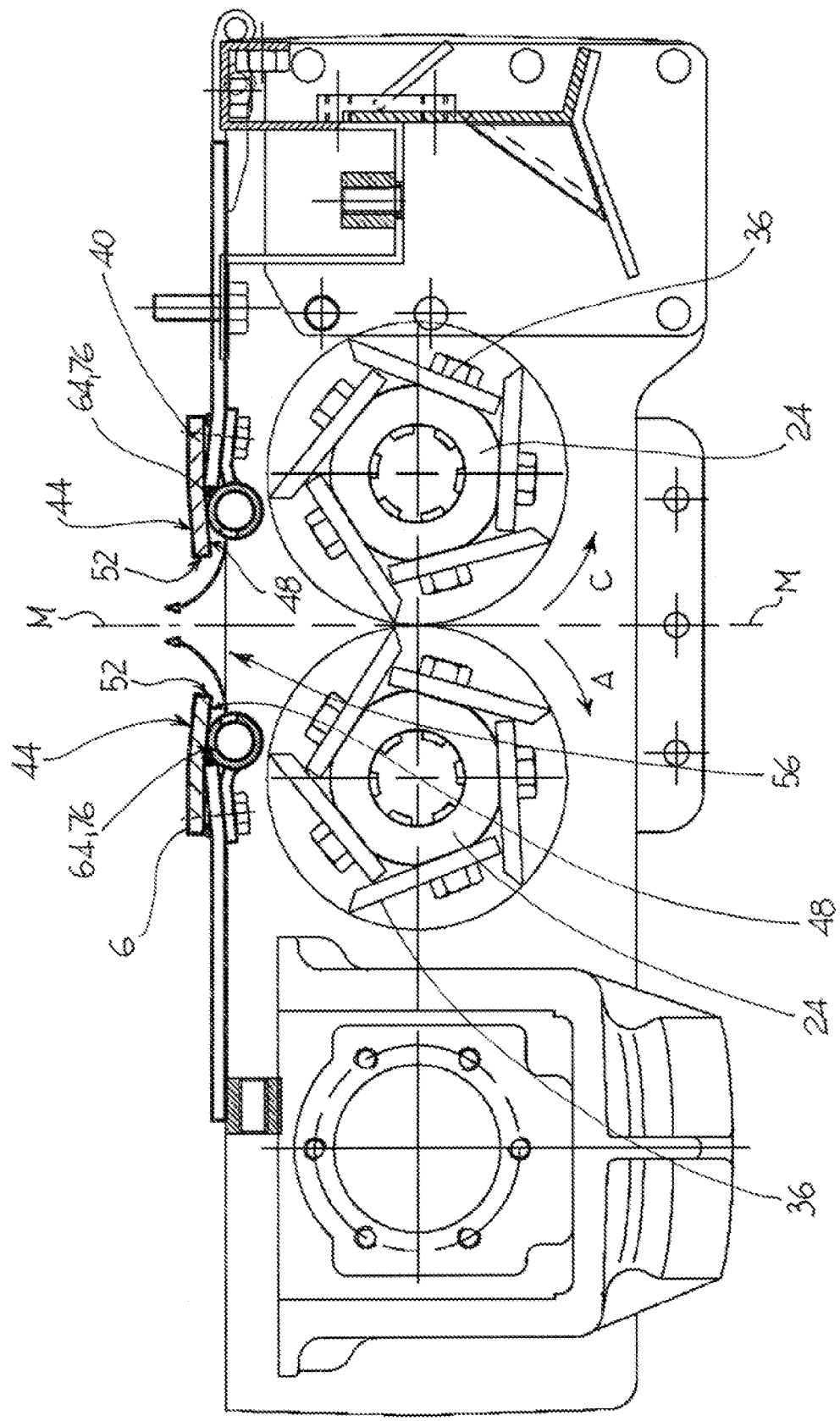
Figure 8:
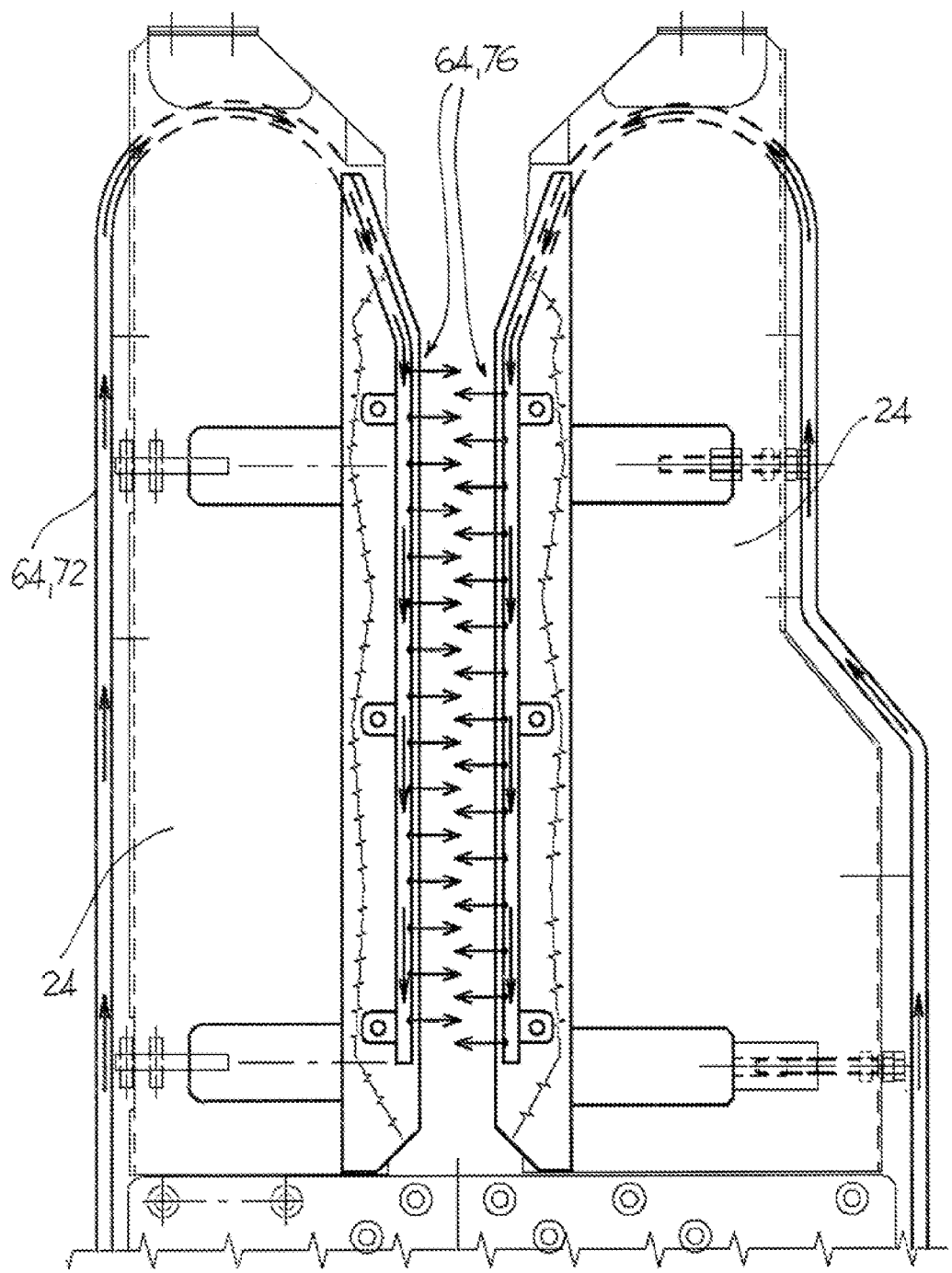
FIG. 8 shows a plan view from above of the machine in FIG. 7.

The elements or parts of elements common to the embodiments described below have been indicated using the same reference numerals.

With reference to the aforesaid drawings, reference numeral 4 globally denotes a corn-shelling machine suitable to perform the shelling of cobs 8.

The corn-shelling machine comprises a front head 12 suitable to shell the cobs 8 and a rear auger 16 suitable to gather and channel the cobs 8 after shelling.

In particular, the cobs 8 are shelled or detached from the relative stem or stalk 20 after being pulled downwards, as will be described in more detail below.

The front head 12 comprises at least one sheller roller 24 rotating in relation to a relative rotation axis X-X, Preferably, the front head 12 comprises at least one pair of sheller rollers 24 counter-rotating in relation to relative rotation axes (X-X).

Said rotation axes X-X may be parallel or convergent with each other.

The sheller rollers 24 extend from a front end 28, facing the front head 12, to a rear end 32, facing the rear auger 16.

The sheller rollers 24 are fitted with blades 36 to pull the stalk 20 of a corn on the cob plant downwards; the rotation of the rollers is therefore such as to achieve such downward movement or shelling of the cobs 8. The detach of cobs 8 is of the destructive type: in other words the cobs are abruptly detached from the stalk 20 of the plant thanks to the combined action of sheller rollers 24 which, being counter-rotating, cooperate each other in order to detach downwards the cobs 8. Moreover, after detaching the cobs 8, the stalk 20 is completely destroyed.

The corn-shelling machine 4 is fitted with sheller plates 40, positioned above the sheller rollers 24, on the side opposite the ground.

Preferably said sheller plates 40 are adjustable in position in relation to the frame of the corn-shelling machine 4.

Said sheller plates 40 may also be fixed.

The sheller plates 40 have an upper wall 44, opposite the ground and suitable to receive the cobs 8 upon thrashing and to retain them during the shelling phase, and a lower wall 48, opposite the upper wall 44 flanking the ground.

The sheller plates 40 flank each other in a transversal direction Y-Y perpendicular to the rotation axes X-X of the sheller rollers 24.

The sheller plates 40 are distanced so as to identify, between respective lateral rims 52, a cavity 56 suitable for permitting the passage of the stalk 20 and preventing the passage of the cobs 8, during the shelling of the same. In other words, the cavity 56 is equal in width, measured parallel to the transversal direction Y-Y, to the distance between the respective lateral rims 52 of the sheller plates 40. Such width is at least equal to the width of the stalk 20 but is less than the width of the cob 8 so as to prevent the cob from passing through said cavity 56. Therefore, the cob 8 is pulled downwards by means of the stalk 20 which is pulled downwards by the blades 36 of the sheller rollers 24 and, when the cob is near the cavity 56 of the sheller plates 40, it interferes with the lateral rims 52 of the sheller plates 40 against which the cob is pulled until it detaches from the stalk 20.

By using sheller plates 40 adjustable in relation to the frame of the corn-shelling machine 4 it is possible, by modifying the position of said plates 40, to increase or decrease the width of said cavity 56 as needed.

According to one embodiment, the corn-shelling machine 4 further comprises channelling blades 60, positioned above the upper wall 44 of the sheller plates 40, said channelling blades 60 being provided with a substantially translatory movement from the front end 28 to the rear end 32 of the sheller rollers 24, so as to push the cobs 8 to flow onto the sheller plates 40 towards the rear auger 16.

Advantageously, the corn-shelling machine 4 comprises blower means 64 which generate and send a flow of air to channel the kernels of corn, removed from the cobs 8 during shelling, towards the rear auger 16, said air flow being directed from the front head 12 of the machine 4 towards the rear auger 16.

According to one embodiment, the blower means 64 comprise at least one blower 68, at least a first supply duct 72 of the air flow generated by the blower 68, and at least one exit nozzle 76 suitable to channel the air onto the kernels, in the direction of the rear auger 16.

The blower 68 may be of any type; preferably the blower 68 is contained in a casing 80 and is positioned on the rear part of the machine 4, for example above and rearwards of the rear auger 16.

The first supply duct 72 extends from the blower 68, from which it withdraws the air flow to be distributed, towards the front head 12 so as to distribute the air flow starting from the front end 28 of the sheller rollers 24, towards the rear end 32 of said sheller rollers 24.

Figure 9:
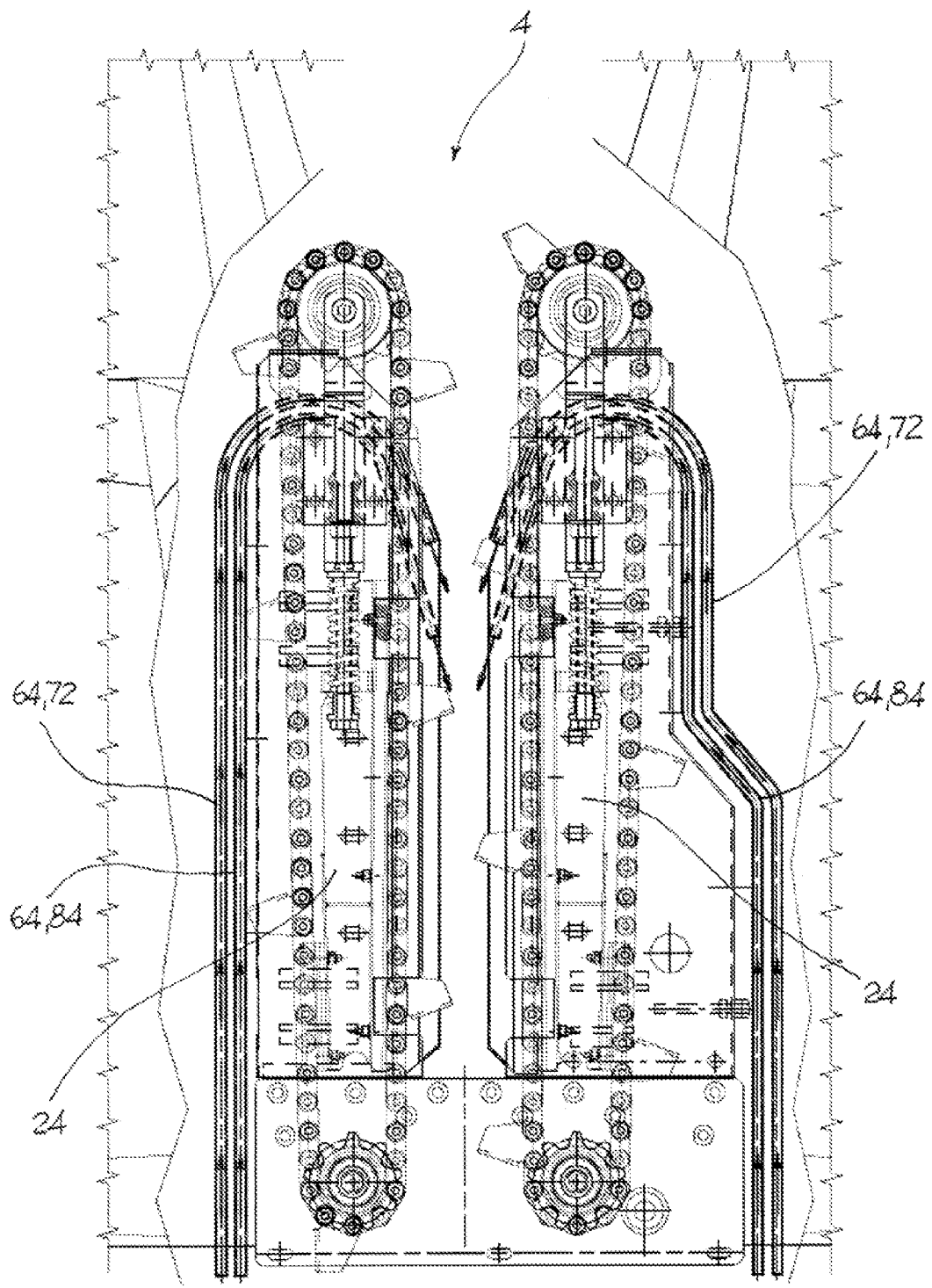
FIG. 9 shows a plan view of a machine according to a further embodiment of the present invention.

According to a further embodiment (FIG. 9), the corn-shelling machine 4 comprises a second supply duct 84, fluidically separate from the first supply duct 72, so as to strengthen the air flow acting on the kernels of corn.

The nozzles 76 may be made by making holes in the supply ducts 72, 84 of the air flow.

According to further embodiments, the nozzles 76 are portions of tube applied to the supply duct 72, 84, said portions being connected to the duct 72, 84 by fixed connections and/or adjustable connections. In other words, portions of tube may be welded to the ducts 72, 84 in a rigid manner, or swivel joints inserted for example to enable adjustments of the inclination of the portions of tube so as to direct the air flow as desired.

Preferably, the nozzles 76 are inclined upwards, away from the ground, so as to direct the air flows above the sheller plates 40, on the side of the upper wall 44, towards the rear auger 16.

In particular, the jet of air supplied by the nozzles 76 is inclined upwards, moving from the front end 28 to the rear end 32 of the sheller rollers 24, so that the corn kernels struck by the same have a substantially parabolic movement towards the rear auger 16.

Preferably, the nozzles 76 are positioned under the sheller plates 40, on the side of the lower wall 48. In particular, the nozzles 76 are for example positioned directly under the sheller plates 40, that is on the lower walls 48, so as to obtain a jet of air which is dispensed as close as possible to the lateral rims 52 of the sheller plates 40 against which the cob 8 is pressed until torn from the relative stalk 20. In fact, following the pressing of the cob 8 against the sheller plates 40 the cob 8 itself becomes shelled, that is tends to lose the kernels of corn on account of rubbing against the lateral rims 52. The shelling movement of the cobs 8 tends to push them downwards, that is towards the ground, and therefore the kernels too which are shelled from the cobs 8 tend to fall to the ground if they do not first bounce off the upper wall 44 of the sheller plates 40. Moreover, the nozzles 76 are positioned, under the sheller plates 40, so as to be positioned rearwards of the lateral rims 52 of the sheller plates 40, in a transversal direction Y-Y perpendicular to the rotation axes X-X of the sheller rollers 24. The positioning of the nozzles 76 directly under the sheller plates 40, enables them not to interfere with the shelling of the cob 8 and to limit falling of the kernels to the ground to the maximum. In fact, the upper wall 44 is not modified by the presence of the nozzles 76 which are rather protected from direct contact with the cobs 8. This way the shelling action is not altered and the cob can be easily torn from the stalk 20. Moreover, any kernels passing through the cavity 56 identified between the lateral rims 52 are immediately struck by the jet of air which prevents them from falling downwards and enables their upward movement, that is from the side of the upper wall 44 of the sheller plates 40. It is important for the kernels to be channelled upwards as soon as possible in their falling movement otherwise, under the effect of the jet of air, the kernels could strike against the lower wall 48 of the plate 40 without succeeding in passing beyond the cavity 56. In such event, despite the presence of the jets of air, the kernels would end up falling on the ground without being recovered. Moreover, the kernels passing beyond the jet of air of the nozzles 76 would end up in contact with the blades 36 of the sheller rollers 24 and would therefore be damaged or destroyed. As a result, the specific positioning of the nozzles under the sheller plates 40, on the lower wall 48, on the one hand prevents interference with the shelling action of the cob performed by the sheller plates 40 and by the relative lateral rims 52 and on the other makes it possible to optimise the recovery of the kernels which are immediately sustained by the jet of air so as to come out of the cavity 56 immediately and not arrive at the sheller rollers 24 where they could no longer be recovered. It should be noted that the direction of the jets of air generated by the nozzles 76 is opposite to the shelling direction of the cobs 8: in other words the cobs 8 are pulled towards the ground while the jets are directed upwards to oppose the falling movement of the kernels caused by the rollers. The two actions, respectively of shelling by the sheller rollers 24 and of recovering the kernels by the nozzles, despite being mutually opposed, do not interfere with each other thanks to the specific positioning of the nozzles 76. In fact, the nozzles 76 do not interfere with the contact of the upper wall 44 of the sheller plates 40 and the cobs 8 and, at the same time, act on the kernels at the point in which they are detached from the cob so as to facilitate their recovery. Moreover, the nozzles 76 co-operate with the channelling blades 60, positioned on the side of the upper wall 44 of the sheller plates 40. In fact the nozzles 76 keep the kernels suspended near the sheller plates 40 on the side of the upper wall 44 so that the kernels can be intercepted and channelled together with the cobs 8 towards the rear auger 16. No further baffles above the sheller plates 40 need therefore be added to this to facilitate the channelling and recovery of the kernels detached from the cobs.

According to one embodiment, the nozzles 76, and therefore the relative flows of air supplied, converge in relation to a centreline plane M-M positioned between the sheller rollers 24 and perpendicular to the ground, so as to generate an air flow substantially symmetrical to said centreline plane M-M.

The nozzles 76 may be attached to portions of the corn-shelling machine frame 4, said portions being mechanically separate from the sheller plates 40.

According to a further embodiment, the nozzles 76 are attached directly under the sheller plates 40, at the lower walls 48 of the sheller plates 40.

The corn-shelling machine 4 may also be provided with supplementary nozzles 88 positioned on the rear auger 16, so as to further push the kernels of corn towards said auger.

The functioning of a corn-shelling machine according to the invention will now be described.

During the functioning of the machine in a direction of advancement F (FIG. 1) the sheller rollers 24 are activated in rotation in respectively counter-rotating movements, that is to say in opposite directions of rotation A,C (FIG. 7) so as to impress upon the corn on the cob plants a downward movement, called "shelling".

The sheller rollers 24, in fact create a shelling movement of the cobs 8 by means of the respective blades 36 so as to grasp the stalk 20 of the corn on the cob plants and press the plant downwards, forcing the plants to pass through the cavity 56 identified between the lateral rims 52 of the sheller plates 40.

In such forced passage, the stalk slips through the cavity 56 to the ground while the cobs 8 strike against the upper wall 44 of the sheller plates 40 without crossing the cavity 56. The cobs 8 detached from the plant and lying on the upper wall 44 of the sheller plates 40 are then channelled towards the rear auger 16 by the action of the channelling blades 60.

During the shelling operation of the cobs 8, the nozzles 76 continuously send air flows towards the rear auger 16, said flows preferably having a parabolic pattern, in other words inclined upwards, moving from the front end 28 to the rear end 32 of the sheller rollers 24.

Such air flows act in particular on the kernels of corn which inevitably detach themselves from the cobs 8 during the shelling phase. This way the kernels separated from the cobs 8 do not fall to the ground through the cavity but are pushed by the air flow towards the rear auger 16 and here recovered together with the rest of the cobs 8. Advantageously, the cobs do not contact the blades of the sheller rollers which would surely damage them. In other words, thanks to the positioning of the nozzles just under the plates, the cobs never go down the sheller plates but they always remains over them so as to be easily conveyed towards the rear auger also thanks to the combined effect of the catch and conveying by the channelling blades.

According to one embodiment, further air flows are positioned at the rear auger 16, so as to further push the kernels detached from the cobs 8 towards the auger and limit the loss of kernels as much as possible.

As may be appreciated from the description, the corn-shelling machine according to the invention makes it possible to overcome the drawbacks presented of the prior art.

In particular, the blower means permit a considerable recovery of the kernels detached from the cobs upon contact with the sheller plates; such kernels do not therefore fall to the ground but are advantageously channelled towards the auger together with the cobs themselves.

The machine which the present invention relates to is particularly efficient and in no way reduces productivity compared to the known machines: in fact the speed of advancement of the corn-shelling head may be the same as conventional machines. In other words, the system of recovering the kernels by means of the blower means does not require a reduced speed of advancement of the machine in order to work.

The blower means are light and economical to mount on the corn-shelling machine and do not require special modifications of the pre-existing machines of the prior art. In other words, the blower means may be added to pre-existing machines significantly improving the yield of corn harvesting.

The blower means are furthermore simple and reliable and in no way subject to jamming even after prolonged functioning.

In fact, apart from the rotor, which is moreover located in a sheltered and protected position, the blower means do not contain parts which may jam and come into contact with other moving parts of the machine.

Moreover, any obstructions of the nozzles, for example caused by stones, mud or corn on the cob residues are prevented by the very presence of the continuous flow of air which keeps the nozzles free at all times.

The blower system lastly does not entail appreciable increases in consumption of the machine.

A person skilled in the art may make numerous modifications and variations to the corn-shelling machine and corn-shelling methods described above so as to satisfy contingent and specific requirements all contained within the sphere of protection of the invention as defined by the appended claims.

I claim:

1. Corn-shelling machine able to harvest the kernels from the cob, the machine having a front head able to shell the cobs and a rear auger able to gather and channel the cobs after shelling, wherein
   the front head comprises at least one sheller roller rotating in relation to a relative rotation axis so as to pull downwards the cobs,
   the at least one sheller roller extending from a front extremity facing towards the front head, to a rear extremity, facing towards the rear auger,
   the at least one sheller roller being fitted with blades to pull a stalk of a corn on the cob plant downwards,
   the machine being fitted with sheller plates, positioned above said at least one sheller roller, on the side opposite the ground, the sheller plates having an upper wall, opposite the ground able to receive the cobs upon thrashing and to retain them during the shelling phase, and a lower wall, opposite the upper wall flanking the ground,
   the sheller plates being distanced so as to identify, between respective lateral rims, a cavity suitable for permitting the passage of the stalk and preventing the passage of the cobs, during the shelling of the same, wherein
   the machine comprises blowing devices and nozzles which generate and send a flow of air to channel the kernels of corn removed from the cobs during shelling, towards the rear auger, said air flow being directed from the front head of the machine towards the rear auger,
   wherein said nozzles are attached directly below the sheller plates, on said lower walls of the sheller plates, and
   wherein the nozzles are inclined upwards, away from the ground, so as to direct the air flows above the sheller plates, on the side of the upper wall, towards the rear auger.

2. Corn-shelling machine according to claim 1, wherein the corn-shelling machine comprises channelling blades, positioned above the upper wall of the sheller plates, said channelling blades being provided with a substantially translatory movement from the front end to the rear end of the sheller rollers, so as to push both the cobs and the kernels, suspended by the flow of air of the nozzles, to flow onto the sheller plates towards the rear auger.

3. Corn-shelling machine according to claim 1, wherein said blowing devices comprise at least one blower, at least a first supply duct of the air flow generated by the blower, and at least one exit nozzle able to channel the air onto the kernels, in the direction of the rear auger.

4. Corn-shelling machine according to claim 3, wherein said first supply duct extends from the blower, from which it withdraws the air flow to be distributed, towards the front head so as to distribute the air flow from the front extremity of the sheller rollers, towards the rear extremity of said sheller rollers.

5. Corn-shelling machine according to claim 3, wherein said nozzles are made by making holes in the first supply duct of the air flow.

6. Corn-shelling machine according to claim 3, wherein said nozzles are portions of tube applied to the supply duct, said portions being connected to the supply duct by fixed connections and/or adjustable connections.

7. Corn-shelling machine according to claim 1, wherein said nozzles converge in relation to a centreline plane positioned between the sheller rollers and perpendicular to the ground, so as to generate an air flow substantially symmetrical to said centreline plane.

8. Corn-shelling machine according to claim 1, wherein said nozzles are attached to portions of the machine frame, said portions being mechanically separate from the sheller plates.

9. Corn-shelling machine according to claim 1, comprising supplementary nozzles positioned on the rear auger, so as to further push the kernels of corn towards said auger.

10. Corn-shelling machine according to claim 1, comprising a second supply duct, fluidically separate from the first supply duct so as to strengthen the air flow acting on the kernels of corn.

11. Corn-shelling machine according to claim 1, comprising at least one pair of sheller rollers, said sheller rollers being counter-rotating in relation to relative rotation axes, said rotation axes being parallel or convergent.

12. Method of shelling using a corn-shelling machine having a front head able to shell the cobs and a rear auger able to gather and channel the cobs after shelling, wherein the front head comprises at least one sheller roller rotating in relation to a relative rotation axis so as to pull downwards the cobs, the at least one sheller roller extending from a front extremity facing towards the front head, to a rear extremity, facing towards the rear auger, the at least one sheller roller being fitted with blades to pull a stalk of a corn on the cob plant downwards, the machine being fitted with sheller plates, positioned above said at least one sheller roller, on the side opposite the ground, the sheller plates having an upper wall, opposite the ground able to receive the cobs upon thrashing and to retain them during the shelling phase, and a lower wall, opposite the upper wall flanking the ground, the sheller plates being distanced so as to identify, between respective lateral rims, a cavity suitable for permitting the passage of the stalk and preventing the passage of the cobs, during the shelling of the same, wherein the machine comprises blowing devices and nozzles which generate and send a flow of air to channel the kernels of corn removed from the cobs during shelling, towards the rear auger, said air flow being directed from the front head of the machine towards the rear auger, wherein said nozzles are attached directly below the sheller plates, on said lower walls of the sheller plates, and wherein the nozzles are inclined upwards, away from the ground, so as to direct the air flows above the sheller plates, on the side of the upper wall, towards the rear auger, said method comprising the steps of:

activating in rotation at least one sheller roller, during the advancement of the machine in a direction of advancement, the sheller roller creating a shelling movement of the cobs so as to grasp the stalk of the cobs and press the plant downwards, forcing the cobs against an upper wall of the sheller plates, directing a first continuous flow of air at the sheller plates, directed from the front head towards the rear auger, so as to channel the kernels detached from the cobs towards the rear auger upon contact with the sheller plates.

13. Method according to claim 12, comprising the step of directing a second continuous flow of air at the rear auger, so as to further push the kernels detached from the cobs towards the rear auger.

\* \* \* \* \*